United States Patent
Devison

(10) Patent No.: US 8,451,881 B2
(45) Date of Patent: May 28, 2013

(54) SYSTEM AND METHOD FOR TRANSCEIVER CONTROL OF PERIPHERAL COMPONENTS

(75) Inventor: Stephen Arnold Devison, Waterloo (CA)

(73) Assignee: Icera Canada ULC, Calgary (CA)

( * ) Notice: Subject to any disclaimer, the term of this patent is extended or adjusted under 35 U.S.C. 154(b) by 524 days.

(21) Appl. No.: 12/598,715

(22) PCT Filed: May 5, 2008

(86) PCT No.: PCT/CA2008/000856
§ 371 (c)(1),
(2), (4) Date: Nov. 3, 2009

(87) PCT Pub. No.: WO2008/134884
PCT Pub. Date: Nov. 13, 2008

(65) Prior Publication Data
US 2010/0124260 A1    May 20, 2010

Related U.S. Application Data

(60) Provisional application No. 60/915,758, filed on May 3, 2007.

(51) Int. Cl.
*H04B 1/38* (2006.01)

(52) U.S. Cl.
USPC .......................................... 375/219; 375/359

(58) Field of Classification Search
USPC .................. 375/219–222, 356, 359
See application file for complete search history.

(56) References Cited

U.S. PATENT DOCUMENTS

| 4,254,504 | A | | 3/1981 | Lewis et al. | |
|---|---|---|---|---|---|
| 5,339,395 | A | * | 8/1994 | Pickett et al. | 710/305 |
| 5,694,425 | A | * | 12/1997 | Suganuma et al. | 375/240 |
| 5,812,881 | A | * | 9/1998 | Ku et al. | 710/71 |
| 5,969,841 | A | * | 10/1999 | McGinley et al. | 398/136 |
| 6,446,867 | B1 | * | 9/2002 | Sanchez | 235/454 |
| 6,551,846 | B1 | * | 4/2003 | Furutani et al. | 438/17 |
| 6,914,637 | B1 | * | 7/2005 | Wolf et al. | 348/473 |
| 6,958,768 | B1 | * | 10/2005 | Rao et al. | 348/86 |
| 7,729,382 | B2 | * | 6/2010 | Rosner et al. | 370/474 |
| 2002/0115457 | A1 | * | 8/2002 | Koscal | 455/466 |
| 2003/0002459 | A1 | * | 1/2003 | Igarashi et al. | 370/330 |
| 2004/0143774 | A1 | * | 7/2004 | Jacobs | 713/400 |
| 2004/0151140 | A1 | | 8/2004 | Rozenblit et al. | |
| 2004/0186688 | A1 | * | 9/2004 | Nejedlo | 702/186 |
| 2005/0216245 | A1 | * | 9/2005 | Hobson | 703/14 |
| 2005/0233692 | A1 | * | 10/2005 | Hooijmans et al. | 455/3.02 |
| 2006/0062286 | A1 | * | 3/2006 | Park et al. | 375/219 |

(Continued)

FOREIGN PATENT DOCUMENTS

| CA | 2478023 A1 | 9/2003 |
|---|---|---|
| EP | 1887817 A2 | 2/2008 |
| WO | 2004047387 A2 | 6/2004 |

*Primary Examiner* — Emmanuel Bayard

(57) ABSTRACT

Peripheral components of a wireless radio system can be controlled by a wireless transceiver. The transceiver stores parallel or serial bit patterns in memory, each bit pattern corresponding to a particular control configuration for one or more peripheral components. A further control device, such as baseband controller, issues an address corresponding to the desired functional operation of the peripheral components to the transceiver. A memory sub-system of the transceiver uses the address to output the appropriate bit pattern. The bit pattern can be provided in parallel to statically control individual control lines, or can be converted into a serial bitstream decodable by a command decoder. The command decoder can then decode the bitstream and locally issue the appropriate control signals for the peripheral components.

27 Claims, 9 Drawing Sheets

U.S. PATENT DOCUMENTS

| | | | |
|---|---|---|---|
| 2006/0149870 A1* | 7/2006 | Sears et al. | 710/71 |
| 2006/0190794 A1* | 8/2006 | Murata | 714/742 |
| 2008/0065299 A1* | 3/2008 | Brunstetter | 701/51 |
| 2009/0019331 A1* | 1/2009 | Geissler | 714/733 |
| 2011/0053648 A1* | 3/2011 | Gustaf | 455/562.1 |
| 2012/0051411 A1* | 3/2012 | Duron et al. | 375/224 |

* cited by examiner

SYSTEM AND METHOD FOR TRANSCEIVER CONTROL OF PERIPHERAL COMPONENTS

CROSS REFERENCE TO RELATED APPLICATIONS

This application claims the benefit of priority of U.S. Provisional Patent Application No. 60/915,758 filed on May 3, 2007, which is incorporated herein by reference in its entirety.

FIELD OF THE INVENTION

The present invention relates generally to full radio systems. In particular, the present invention relates to radio frequency (RF) transceiver control of peripheral components within radio systems.

BACKGROUND OF THE INVENTION

Wireless devices have been in use for many years for enabling mobile communication of voice and data. Such devices can include mobile phones and wireless enabled personal digital assistants (PDA's) for example. FIG. 1 is a generic block diagram of the core components of a wireless device. The wireless device 10 includes a base band processor 12 for controlling application specific functions of the wireless device and for providing and receiving voice or data signals to and from a signal processing device, such as a radio frequency (RF) transceiver chip 14.

The RF transceiver 14 includes a communication core consisting of a transmitter core 22 and a receiver core 24. Generally, the RF transceiver 14 transforms data signals from one form to the other. For example, the transmitter core 22 is responsible for up-converting electromagnetic signals from base band to higher frequencies for transmission, while receiver core 24 is responsible for down-converting those high frequencies back to their original frequency band when they reach the receiver, processes known as up-conversion and down-conversion (or modulation and demodulation) respectively. The original (or base band) signal may be, for example, data, voice or video.

A peripheral circuit block 16 includes other components, such as for example low noise amplifiers for receiving wireless data from antenna 18, and power amplifiers for sending wireless data to antenna 18. There may be multiple low noise amplifiers and power amplifiers each calibrated, designed or configured to operate for a specific communications standard. For example, such communications standards include wireless communications standards such as the Global System for Mobile communications (GSM) standard and the Enhanced Data rates for GSM Evolution (EDGE) standard. It would be appreciated by a person skilled in the art that a single multi-standard compatible wireless device can include many such peripheral components. Accordingly, the transceiver 14 includes the necessary circuits for ensuring that the communication signals are properly transformed to meet the specifications of each standard. Therefore by example, the transceiver 14 can operate in the GSM or EDGE modes. The RF transceiver 14 and peripheral circuit block 16 are considered the radio system of the wireless device 10. Of course, other peripheral circuits not shown in FIG. 1 can be considered a peripheral component within peripheral circuit block 16. Those of skill in the art should understand that FIG. 1 is a simplified block diagram, and can include other functional blocks that may be necessary to enable proper operation or functionality of the wireless radio system 10.

In one configuration of wireless device 10, the peripheral circuits of the peripheral circuit block 16 are individually connected to the wireless device motherboard or daughterboard, and controlled by the baseband processor via control bus 20. In view of the number of available communication standards, more of such peripheral components are required, which can add complexity to the layout of the motherboard. Since each peripheral component is controlled independently (i.e. to turn it on/off for example), there will be a 1:1 ratio of base band processor pins to pins of the peripheral components and to interconnecting lines, where each control line controls the functionality or operation of each component. For example, if there are 8 peripheral components to be controlled, then the baseband processor will need to have 8 sets of physical pins, where each set includes any number of signal lines dedicated to control one of the peripheral components. Accordingly, conducting signal tracks are needed for connecting each control line to each peripheral component.

FIG. 2 is a drawing showing four amplifier circuits which are included in the front-end circuit 16 of FIG. 1, which can be all power amplifiers, all low noise amplifiers, or a mix of power amplifiers and low noise amplifiers, depending on the specific application. In FIG. 2, circuit chips 26, or dies are housed in its own package 28. Each package 28 includes by way of example, a reset pin R, an enable pin E, a signal input pin I, a signal output pin O, a ground pin VSS, and a positive voltage pin VDD. It is well known to the person skilled in the art that other control, signal and voltage pins can also be included depending on the function of the die. In the wireless device 10, each package 28 has its metal pin leads or ball grid array (BGA) bumps soldered to a printed circuit board (PCB), or a daughter board electrically coupled to the main PCB. As is known in the art, packages 24 are many times larger in size than the actual chips 26 enclosed therein. While not shown in FIG. 2, the outputs or inputs of one or more of the packages 28 are connected to an antenna switch that selectively couples one of the amplifier circuits to the antenna for either a receive or transmit operation. Accordingly, this antenna switch must also be controlled with knowledge of the specific amplifier circuit being enabled. In the present example with 4 control pins per package 28, there are 16 control signal and data pins that need to be connected to the base band processor 12. This does not include the additional pins of the antenna switch, which are also controlled by the base band processor 12.

Therefore, not only does the packaging 18 increase the required PCB space by virtue of its size, conductive tracks required for routing signals to each amplifier device will also consume PCB space. Furthermore, the length of the conductive tracks should be minimized to minimize wiring capacitance, which imposes design constraints for the layout of the amplifier devices. Thus, the complexity and size of the board they are installed on is increased.

In addition to controlling the numerous peripheral components, the baseband processor 12 is primarily responsible for processing data to be transmitted and data that is received, which requires significant processing capacity by the baseband processor 12 The baseband processor 12 can be implemented with a signal processing device, such as a digital signal processor (DSP) or a custom integrated circuit such as an application specific IC (ASIC). A DSP will already include a large number of pins, therefore it may not be possible to add more pins for controlling a large number of peripheral components. On the other hand, it may be too costly to customize an ASIC to include circuits and pins for controlling these peripheral components. Therefore, not only do additional peripheral components increase the form factor of portable wireless devices, controlling this increasing number of peripheral components in the radio system becomes increasingly complex.

It is, therefore, desirable to provide a wireless device with simplified control over the radio system, and in particular, the peripheral components of the radio system.

SUMMARY OF THE INVENTION

It is an object of the present invention to minimize the area consumed by peripheral components, and to simplify control of such peripheral components in a wireless radio system.

In a first aspect of the invention, there is provided a communication system. The communication system includes a signal processing device, a memory subsystem and a component module. The signal processing device transforms a data signal in a selected mode of operation, and can include a radio frequency transceiver. The memory subsystem provides a previously stored bit pattern corresponding to the selected mode of operation. The component module includes at least two peripheral components in signal communication with the signal processing device. Each of the at least two peripheral components can include one of a power amplifier and a low noise amplifier. The component module receives the previously stored bit pattern for selectively controlling one of the at least two peripheral components. A baseband processor can be included for providing a baseband command corresponding to the selected mode of operation. According to embodiments of the present aspect, the memory subsystem is integrated with the signal processing device, and the baseband command includes a memory address corresponding to an address location of the previously stored bit pattern in the memory subsystem. In a further embodiment, the bit pattern includes a device address corresponding to the one of the at least two peripheral components and operating information for controlling the one of the at least two peripheral components. The bit pattern can be provided as a serial bitstream, and can include an address portion for selecting the one of the at least two peripheral components, and a data portion for controlling states of the one of the at least two peripheral components.

In another embodiment of the present aspect, the memory subsystem includes a parallel to serial converter for providing the serial bitstream. The component module includes a serial to parallel converter, a command decoder and an antenna switch. The serial to parallel converter converts the serial bitstream into parallel data. The command decoder drives signals for controlling the one of the at least two peripheral components, and provides selection signals in response to the parallel data. The antenna switch selectively couples an antenna to the one of the at least two peripheral components in response to the selection signals. In an alternate embodiment, the memory subsystem provides the bit pattern as parallel signals. In such an embodiment, the component module includes a command decoder and an antenna switch. The command decoder drives signals for controlling the one of the at least two peripheral components, and provides selection signals in response to the parallel signals. The antenna switch selectively couples an antenna to the one of the at least two peripheral components in response to the selection signals. The parallel signals can include the selection signals and control signals connected to control inputs of the each of the at least two peripheral components.

In a second aspect, there is provided a method for controlling peripheral components of a communication system. The method includes providing a bit pattern corresponding to a specific operating mode of the communication system to a component module including at least two peripheral components; and controlling one of the at least two peripheral components in response to the bit pattern. In one embodiment of the present aspect, the bit pattern is provided by a radio frequency (RF) transceiver of the communication system, and a base band processor provides a baseband command for setting the operating mode of the transceiver. In another embodiment, the RF transceiver includes a memory subsystem for storing the bit pattern and for providing the bit pattern in response to the baseband command, and the baseband command includes a memory address corresponding to a memory location of the memory subsystem storing the bit pattern.

In yet another embodiment, a further step includes selectively connecting the one of the at least two peripheral components to an antenna in response to the bit pattern. According to a further embodiment, controlling includes decoding the bit pattern for determining an address of the one of the at least two peripheral components and for driving signals for controlling the one of the at least two peripheral components, and providing includes providing the bit pattern as a serial bitstream. The step of decoding includes converting the serial bitstream into parallel signals corresponding to the bit pattern. Alternately, the bit pattern can be provided as parallel signals.

In a third aspect, there is provided a module for a wireless communication system having a signal processing device and an antenna. The module includes a bus interface, at least two components in signal communication with the signal processing device, and an antenna switch. The bus interface receives a bit pattern from the signal processing device, and provides first control signals and second control signals in response to the bit pattern. One of the at least two components are enabled in response to the first control signals. The antenna switch selectively couples the one of the at least two components to the antenna in response to the second control signals. According to an embodiment of the present aspect, the bit pattern is provided as a serial bitstream and the bus interface includes a serial to parallel converter and a command decoder. The serial to parallel converter converts the serial bitstream into parallel signals. The command decoder drives signals for providing the first control signals and the second control signals in response to the parallel signals. In an alternate embodiment, the bit pattern is provided as parallel signals and the bus interface includes a command decoder for driving signals for providing the first control signals and the second control signals in response to the parallel signals.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
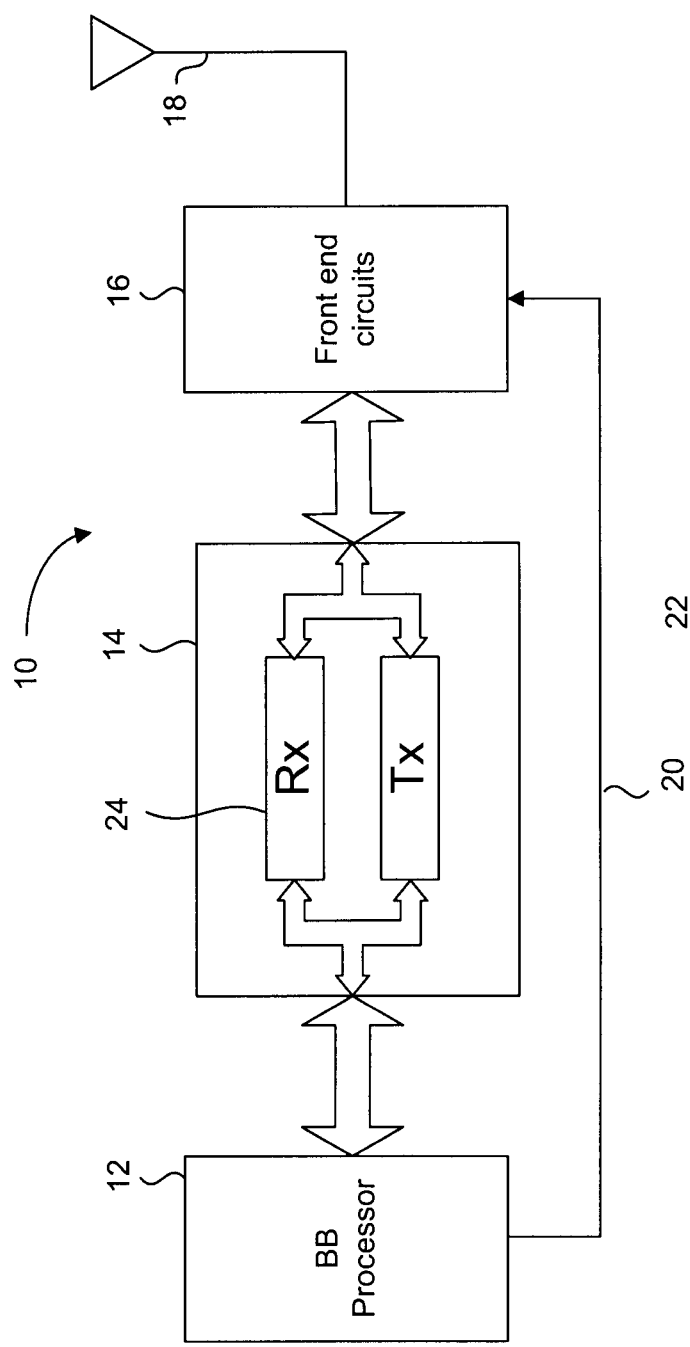
FIG. 1 is a block diagram of a wireless device of the prior art.

The embodiments of the invention are aimed at controlling the peripheral components of the wireless radio system from the communication core, in order to reduce the size of the system and to reduce the processing load on the baseband processor. A communication core includes a receiver, a transmitter, a transceiver, a transponder, a transmitter-receiver, or any circuit that receives or provides a data signal. The description of the present invention hereinafter will be directed to a transceiver. However, the person skilled in the art can readily appreciate that the present embodiments can be applied to a communication system including a receiver, a transmitter, a transmitter-receiver or any device of similar functionality.

According to the present embodiments of the invention, the communication core, such as a wireless transceiver, includes an input/output (I/O) module that handles the transmission and receipt of data. The transceiver stores bit patterns in a memory subsystem such that each bit pattern corresponds to a particular control configuration for a specific radio operation. Each bit pattern stored in the memory is used to control at least two peripheral components. The memory subsystem is accessed by an address corresponding to the desired functional operation of the peripheral components provided by a control device, such as baseband controller or baseband processor. The memory sub-system of the transceiver uses the address to output the appropriate bit pattern. The bit pattern can be provided in parallel to statically control individual control lines. Alternately, the parallel bit pattern is decidable by a command decoder to issue the appropriate control signals for controlling the peripheral components, or the parallel bit pattern can be issued in into a serial bitstream decodable by a command decoder. The command decoder can then decode the bitstream and locally issue the appropriate control signals for the peripheral components.

In order to reduce the space required by the peripheral components, any number of peripheral components used in a wireless device radio system are integrated together into a single package, called an integrated component module. The individual component semiconductor dies can be assembled and packaged together, or a single consolidated die can include all the circuits that would otherwise be implemented on individual semiconductor dies. This can be called a system in package (SIP), and in the present context, will be referred to as an integrated component module. The integrated component module simplifies board layout, and uses far less board space than individually packaged components.

The integrated component module can have one of two types of pin configurations. The first is a scheme where the control lines for each individual front-end component appear as pins on the plastic package. This is a suitable scheme for a module having a small number of components. However, the number of pins will increase with the number of integrated components added to the module. Hence a second scheme can be used which maintains a fixed but reduced number of pins independent of the number of components in the module. There are two variants to this scheme, the first in which the module includes a serial bus interface (SBI) for receiving a serial bitstream of data, which is decoded by logic in a command decoder for controlling one or more of the integrated components at the same time. In the second variant, the module receives a set of signals in parallel, which is decoded by logic in a command decoder for controlling one or more of the integrated components at the same time.

Depending on the radio operation that is to be processed by the transmitter and/or receiver cores of the transceiver, a control device, such as a baseband controller, issues to the memory subsystem a memory address corresponding to the desired functional operation of the peripheral components. Upon receipt of this memory address the memory sub-system of the transceiver outputs the appropriate pre-stored bit pattern. The bit pattern can be provided in parallel to statically control individual control lines, or can be converted into a serial bitstream decodable by a command decoder. The command decoder can then decode the bitstream and locally issue the appropriate control signals for the peripheral components.

The baseband controller is a circuit that can be included in either the communication core or the baseband processor, or can be provided as a separate device. The function of the baseband controller is to issue a baseband command to the memory subsystem in accordance with the radio operation that will be used. In one embodiment the baseband command can be an address to access a memory location of the memory subsystem.

Figure 2:
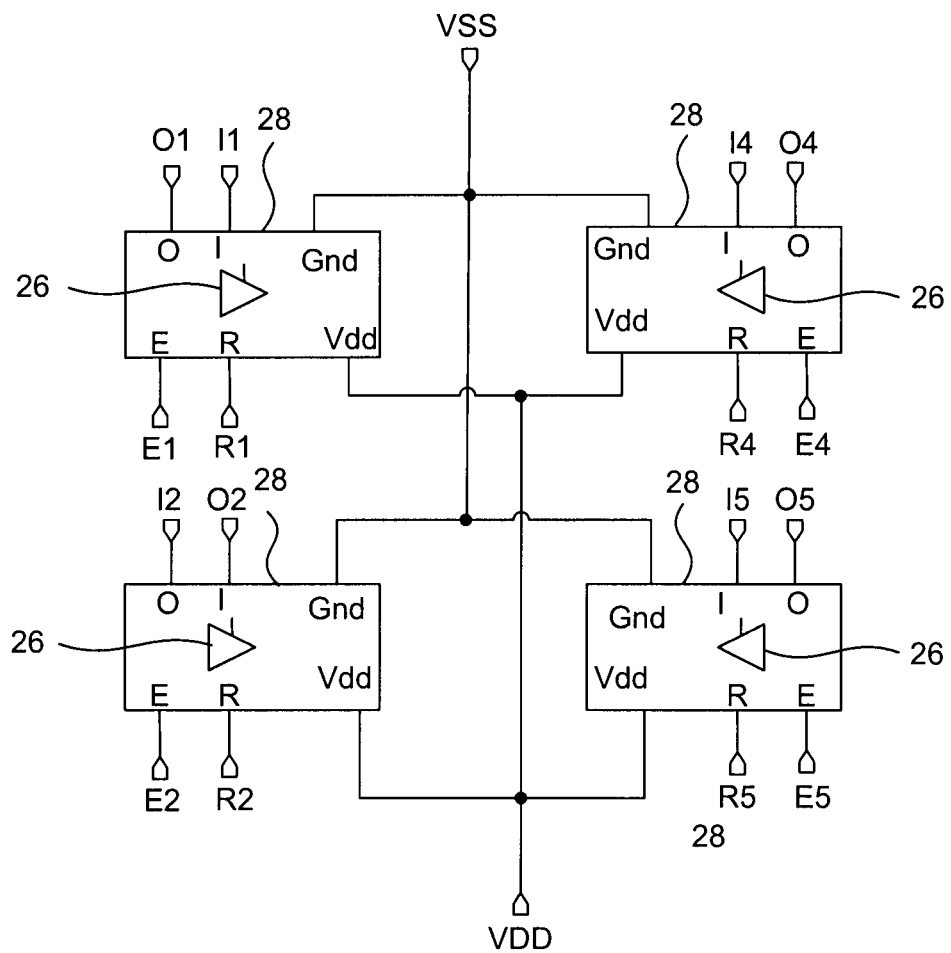
FIG. 2 is a block diagram illustrating the peripheral circuits of the peripheral circuit block of FIG. 1.
Figure 3:
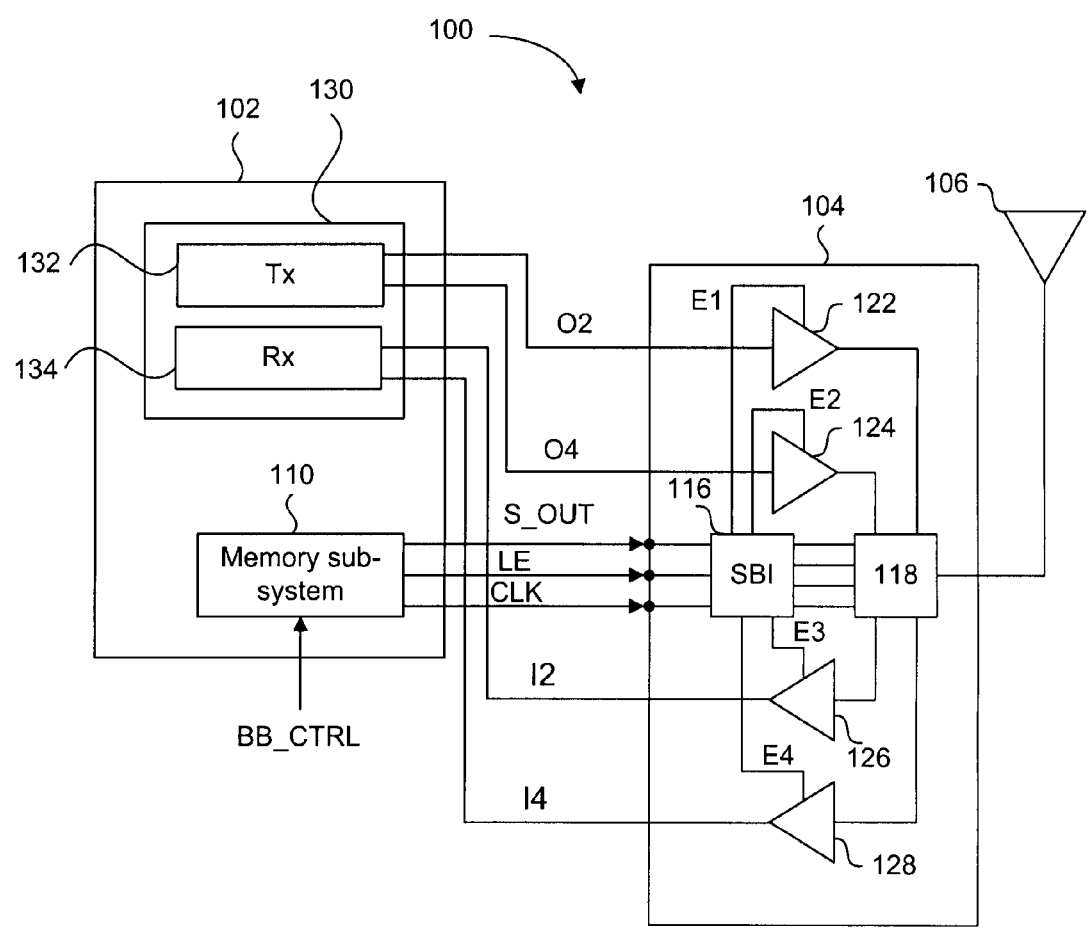
FIG. 3 is a block diagram of a radio system according to an embodiment of the present invention.

FIG. 3 is a block diagram of a wireless radio system according to an embodiment of the present invention. Radio system 100 includes an RF transceiver 102, an integrated component module 104, and an antenna 106. The RF transceiver 102 includes a memory subsystem 110, and an I/O module 130, which in turn includes a transmitter core 132 and a receiver core 134. In the present example embodiment using the same type and number of amplifier devices shown in FIG. 2, there are 8 data and control pins on the package for the integrated component module 104. This is far less than the 16 pins required in wireless systems where the amplifier devices are individually bonded to the PCB. It is noted that voltage pins are not counted in this comparison. Furthermore, it is noted that the packaging for module 104 can be smaller than the aggregate package areas of four individual amplifier devices, thereby saving significant board space.

A memory subsystem can be added to the RF transceiver 102 if none already exists. The memory subsystem 110 interface of the present example can include 3 output pins, each providing a different signal. The first is a serial output signal S_OUT consisting of a serial bitstream, the second is a latch enable LE signal to enable latch circuits within module 104 to latch the bits of signal S_OUT. In an embodiment with two or more modules 104, each module 104 receives the common S_OUT and CLK signals, but each module 104 receives a unique LE signal. The unique LE signal thus identifies the specific module 104 to enable when there is more than one in the wireless device. For example, with two modules 104, the memory subsystem 110 interface can issue two different LE signals, where each is routed to one of the modules 104. The CLK signal can be provided from a different circuit to both the RF transceiver 102 and module 104. S_OUT and LE can be provided in response to a simple command BB_CTRL from the baseband controller. According to an embodiment of the present invention, BB_CTRL can be a memory address identifying the location of the bit pattern that corresponds to a desired operational command.

In the example embodiment of module 104 shown in FIG. 3, there are two power amplifiers (PA) 122 and 124, and two low noise amplifiers (LNA) 126 and 128. In this example, only one of the four amplifier devices is active at any one time for driving a signal onto antenna 106 or for receiving a signal from antenna 106. As previously mentioned, one of the two LNA's is active for receiving a signal from antenna 106 depending on the selected communication standard being used. Similarly, one of the two PA's is active for driving a signal to antenna 106 depending on the selected communication standard being used. Alternately, both PA's can be used for the same standard, where each is activated for different power output levels. The outputs of the PA's 122 and 124 and the inputs of the LNA's 126 and 128 are connected to an antenna switch circuit 118, which is further connected to antenna 106. Antenna switch circuit 118 selectively connects antenna 106 to one of the outputs of PA's 122 and 124 and the inputs of the LNA's 126 and 128, in response to any suitable number of selection signals provided by serial bus interface (SBI) 116. Lines O2 and O4 are output lines that couple the transmitter core 132 to PA's 122 and 124 respectively. Lines I2 and I4 are input lines that couple the receiver core 134 to the LNA's 126 and 128. Accordingly, the module 104 is in signal communication with the transceiver 102, and in particular the transmitter core 132 and receiver core 134.

SBI 116, which includes a command decoder, receives S_OUT, CLK and LE and provides the appropriate control signals to the various components of module 104. SBI 116 can further include latches for storing the bits of S_OUT, such as a serial to parallel converter. The converted parallel version of the serially received bits can then be decoded by the command decoder circuit. Those skilled in the art will understand that the command decoder can be designed to include logic circuits for enabling or disabling signals that control the peripheral circuits in a particular sequence and/or with any desired delay.

In the example embodiment of FIG. 3, SBI 116 enables exactly one of amplifier devices 122, 124, 126 and 128, by driving its enable pin E to the active logic level in response to a valid S_OUT bit sequence. The remaining amplifier devices are disabled because SBI 116 will maintain their respective enable pins E at the inactive logic level. At the same time, SBI 116 provides the proper select signals to antenna switch circuit 118, for electrically coupling antenna 106 to the enabled amplifier device.

Figure 4:
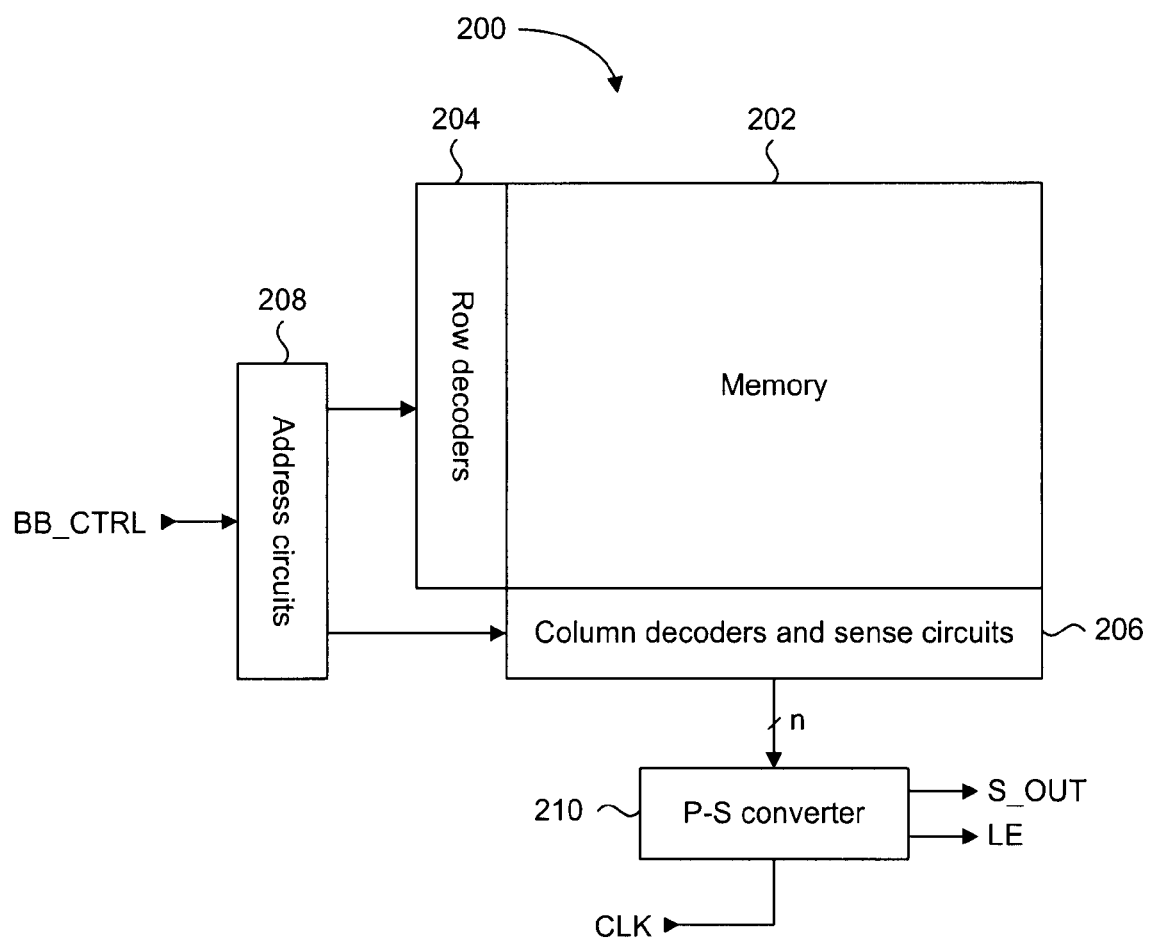
FIG. 4 is a block diagram of the memory sub-system of the radio system of FIG. 3, according to an embodiment of the present invention.

FIG. 4 is a block diagram of a memory subsystem according an embodiment of the present invention. By example, the memory subsystem 200 of FIG. 4 can be used as the memory subsystem 110 shown in the wireless radio system 100 of FIG. 3. Memory subsystem 200 includes a memory array 202, row decoder circuits 204, column decoder and sense circuitry 206, address circuitry 208, and a data conversion means 210. Persons of skill in the art will understand that memory subsystem 200 can include other circuit components, but for sake of simplicity of the schematic, these are not shown in FIG. 4.

The operation of memory array 202, row decoder circuitry 204, and column decoder and sense circuit 206 are well known in the art. Generally, the row decoder will activate one wordline to access all the memory cells connected to it, and the data stored in the memory cells connected to the wordline are provided in parallel to the sense circuits of column decoder and sense circuits block 206. The address circuit 208 receives a multi-bit address, which in the present embodiment is the memory address BB_CTRL, and decodes the address to provide a row address for activating one of the wordlines, and a column address for selecting a subset of the data from the bitlines to be output. In the present example, n bits of data can be provided in parallel from column decoder and sense circuit block 206, where n can be any integer number greater than 0.

Memory 202 can be volatile or non-volatile memory. Examples of volatile memory include dynamic random access memory (DRAM) and static random access memory (SRAM). Examples of non-volatile memory can include flash memory, EEPROM and ROM. Regardless of the memory types used, memory array 202 will have wordlines connected to row decoder circuit 204, and bitlines connected to column decoder and sense circuitry 206. The bitlines are connected to sense amplifier circuits for determining a logic state stored in the accessed memory cells in one activated row of memory cells.

In the present embodiment, data conversion means 210 includes a parallel to serial converter, for converting the parallel set of bits into a serial bitstream of data S_OUT. Parallel to serial converting latches are well known in the art. Logic within data conversion means 210 can extract a bit of information from the output data to serve as the toggling bit for signal LE, which is provided as a static signal in parallel with the S_OUT bitstream. It is noted that the bits of S_OUT are provided synchronously to the clock CLK.

In the present embodiment, the memory sub-system 200 can be preloaded during manufacturing with all the possible bit patterns which are recognizable by the command decoder of integrated component module 104. Therefore, the base band controller of the wireless device only needs to provide an address which corresponds to a control setting or mode of operation for the components of integrated component module 104.

In summary, instead of relying on processing of received data from the baseband processor into a serial bitstream for controlling the module 104, the memory subsystem 110 receives a memory address corresponding to a particular operation, which is then used to access the memory array of memory subsystem 110. Pre-stored data in the addressed memory location will output parallel data, which is a parallel version of the serial bitstream. This parallel data can then be easily converted to a serial bitstream for output as S_OUT to the module 104. A previously mentioned, a bit position of the output data can be designated as the toggling bit for latch enable signal LE, which is then provided on a separate signal line to module 104. A clear advantage of the embodiment of FIG. 3 is that only three signal lines are required for controlling the four amplifier devices of integrated component module 104, thereby minimizing the amount of space required for routing signals.

Figure 5:
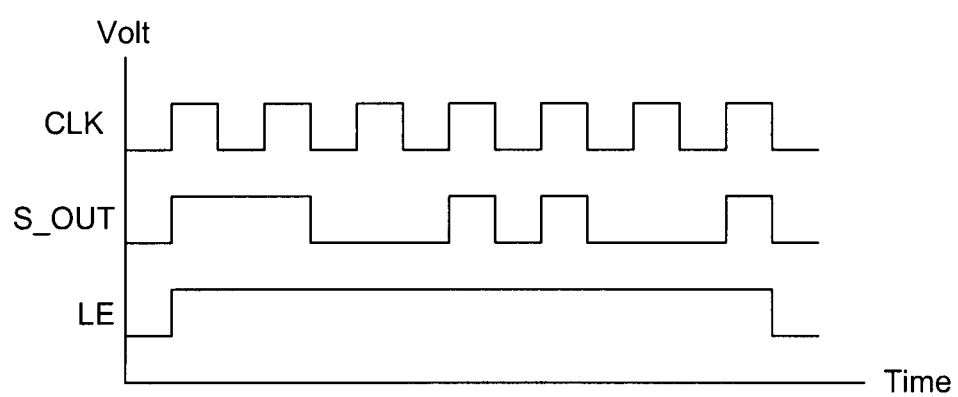
FIG. 5 is a timing diagram illustrating signal sequences for controlling a peripheral component module using a serial signaling bus control scheme, according to an embodiment of the present invention.

FIG. 5 is a timing diagram showing signal traces of signal S_OUT, LE and CLK, to illustrate the operation of RF transceiver 102 and the integrated component module 104 when using the serial bus control scheme of the present embodiment. The high logic level of LE enables SPI 116 to receive and latch the bitstream S_OUT in synchronization with the clock signal CLK. SBI 116 can then decode the serial bitstream of S_OUT to generate the appropriate control signals for controlling the individual components of integrated component module 104. As previously mentioned, SBI 116 includes a serial to parallel converter for generating a parallel version of S_OUT for decoding by the command decoder of SBI 116.

Figure 6:
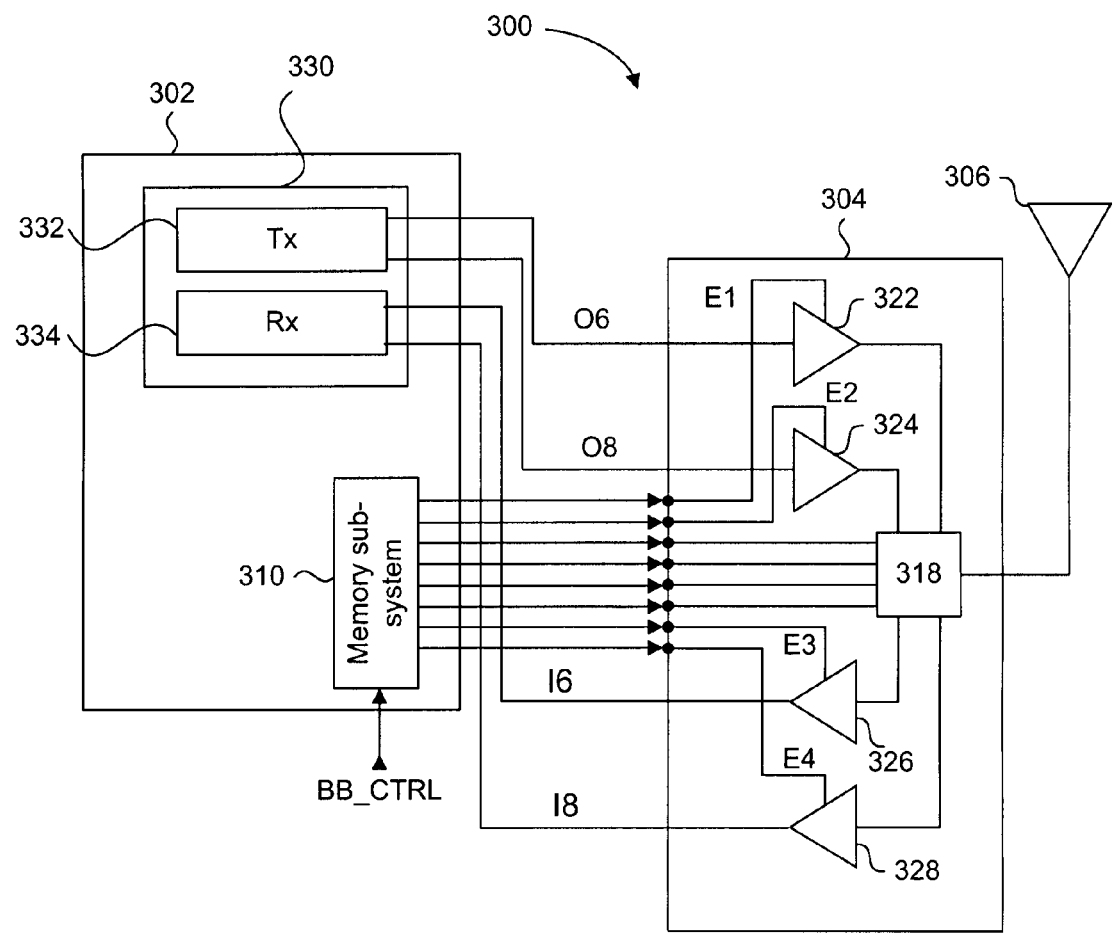
FIG. 6 is a block diagram of a radio system according to another embodiment of the present invention.

FIG. 6 is a block diagram of a wireless radio system according to an alternate embodiment of the present invention. The difference between the system of FIG. 6 and the system of FIG. 3 lies in the control interface between the RF transceiver and the integrated component module. More specifically, the embodiment of FIG. 3 uses a serial bus control scheme where the command to be decoded is provided in a serial bitstream on one signal line. The embodiment of FIG. 6 uses a parallel bus control scheme where the command is provided in parallel on a plurality of signal lines for direct control over the amplifier devices in the integrated component module.

Radio system 300 includes an RF transceiver 302, an integrated component module 304, and an antenna 306. The RF transceiver 302 includes a memory subsystem 310, and an I/O module 330, which in turn includes a transmitter core 332 and a receiver core 334. A memory subsystem can be added to the RF transceiver 302 if none exists. The memory subsystem 310 interface of the present embodiment is shown to have 8 output pins, each providing a different static signal for controlling the amplifier devices of integrated component module 304. A static logic pattern of the 8 output pins can be provided in response to a simple command BB_CTRL from the baseband controller. In the present embodiment, BB_CTRL is a memory address corresponding to a desired operational command.

In the example embodiment of module 304 shown in FIG. 6, there are two PA's 322 and 324 and two LNA's 326 and 328, similar to the integrated component module 104 of FIG. 3. The outputs of the PA's 322 and 324 and the inputs of the LNA's 326 and 328 are connected to an antenna switch circuit 318, which is further connected to antenna 306. Lines O6 and O8 are output lines that couple the transmitter core 332 to PA's 322 and 324. Lines I6 and I8 are input lines that couple the receiver core 334 to the LNA's 326 and 328. In the present embodiment four of the output pins from RF transceiver 302 are directly connected to a corresponding control pin of module 304. More specifically, four of the output pins of RF transceiver 302 correspond to signals E1, E2, E3 and E4, which are used to enable their respective amplifier devices. Another four output pins of RF transceiver 302 are directly provided to antenna switch circuit 318 for selectively controlling which amplifier device is to be electrically coupled to antenna 306. In the present embodiment, no SBI or decoding logic circuitry is required.

In the present embodiment, the memory subsystem 310 will receive a memory address corresponding to a particular operation, which is then used to access the memory array of memory subsystem 310. The pre-stored bit pattern in the addressed memory location will output parallel data, the bit positions of each which can be mapped to a specific pin of module 304 so that one amplifier device is enabled and the antenna switch circuit 318 is set to couple the enabled amplifier device to the antenna 306.

Figure 7:
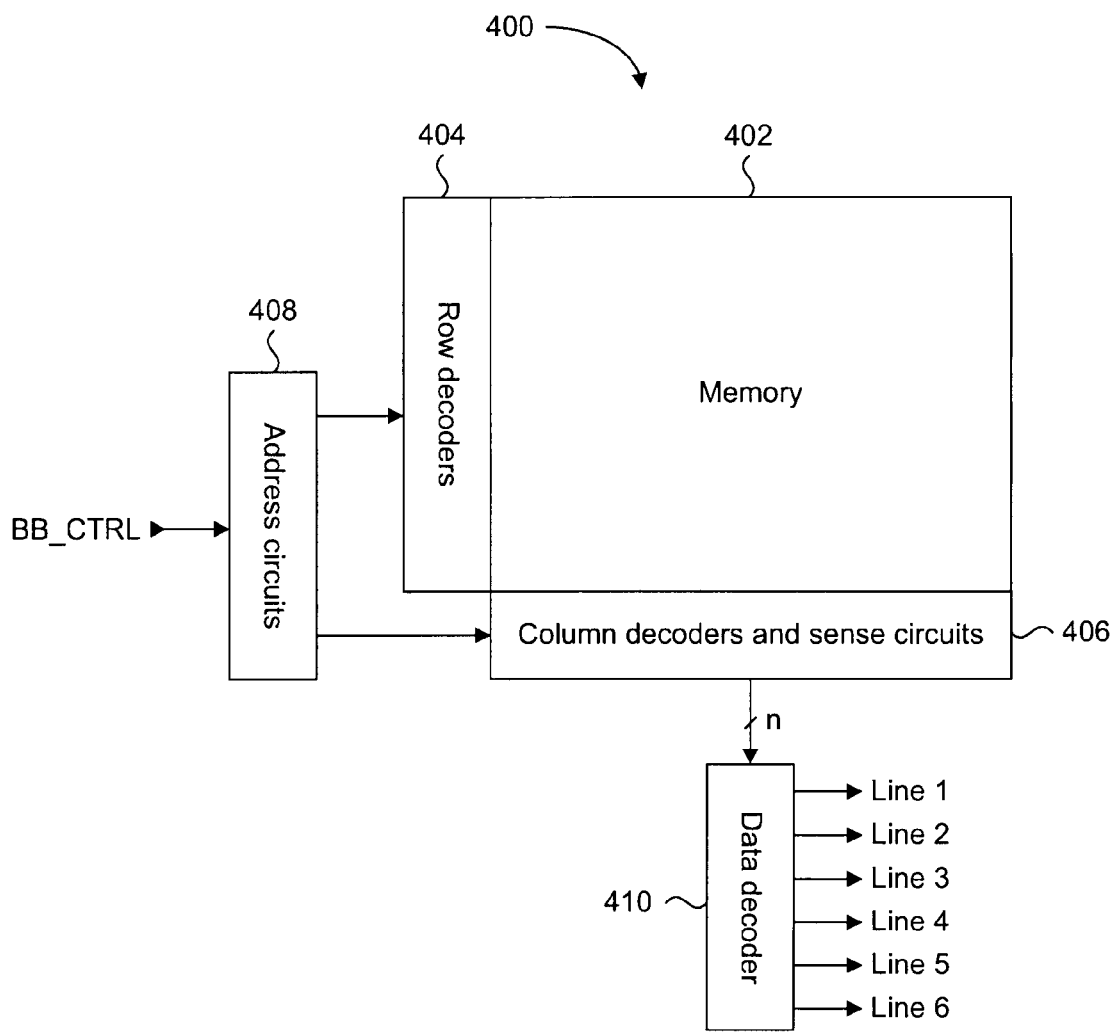
FIG. 7 is a block diagram of the memory sub-system of the radio system of FIG. 6, according to another embodiment of the present invention.

FIG. 7 is a block diagram of the memory sub-system 310 of FIG. 6. Memory sub-system 400 includes a memory array 402, row decoder circuits 404, column decoder and sense circuit 406, address circuits 408 and a data conversion means 410. Elements 402, 404, 406 and 408 can be the same as elements 202, 204, 206 and 208 respectively of FIG. 4. The difference between data conversion means 410 of FIG. 7 and data conversion means 210 of FIG. 4, is that data conversion means 410 has bits from column decoder and sense circuits 406 mapped to specific output lines (Line 1 to Line 6), for output to the integrated component module 304 as parallel signals. In the present embodiment, data conversion means 410 can include latches for maintaining the logic states of Line 1 to Line 6.

Figure 8:
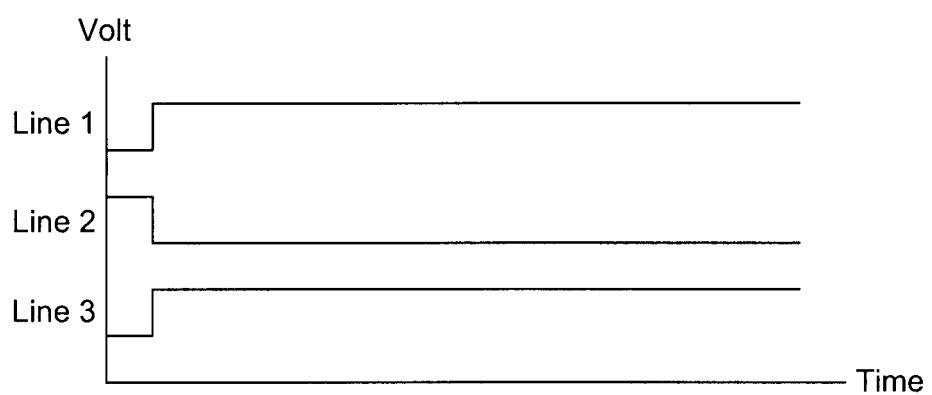
FIG. 8 is a timing diagram illustrating signal sequences for controlling a peripheral component module using a parallel signaling bus control scheme, according to an embodiment of the present invention.

FIG. 8 is a timing diagram illustrating the signal sequences used by RF transceiver 302 and integrated component module 304, for controlling the individual components of module 304. FIG. 8 shows signal traces for three signal lines labeled Line 1, Line 2 and Line 3. As shown in FIG. 8, Line 1 to Line 3 are set to static logic states, which can be directly used to control the individual components of module 304. While FIG. 8 only shows the signal traces for three signal lines, those of skill in the art will understand that there can be any number of signal lines each switchable to either a static high or static low logic state. In the present embodiment, each high logic state and low logic state either enables or disables an amplifier device, or is used for controlling the antenna switch circuit 318.

The embodiments of FIG. 3 and FIG. 6 can be combined with each other to realize yet another alternate embodiment of the invention. In this embodiment, the integrated component module 104 is adapted for use in combination with the parallel bus control scheme of FIG. 6. In such an embodiment, the memory subsystem provides a set number of bits in parallel. The integrated component module 104 is modified to accept the parallel bits for decoding by a command decoder. The command decoder then drives the appropriate internal signals for enabling one amplifier device and for setting the antenna switch circuit to electrically couple the enabled amplifier device to the antenna.

Figure 9:
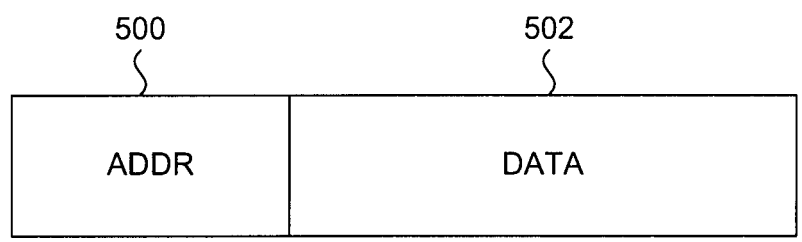
FIG. 9 is a schematic illustration of a control data packet.

FIG. 9 is a schematic illustration of a control data packet stored in memory of FIG. 4. FIG. 9 is merely one example configuration showing an address portion 500 and a data portion 502. The address portion 500 and the data portion 502 are both bit patterns of pre-determined lengths, which are recognized by the command decoder of the integrated component module. In the present embodiment, the address portion is used to identify or select one or more components of integrated component module 304 which is to be controlled, and data portion 502 can include operating information relating to the states of the components addressed in address portion 500. The control data packet of FIG. 9 can be provided serially in bitstream S_OUT of FIG. 3, or as a parallel set of bits via Line 1 to Line 6 of FIG. 7.

The previously presented embodiments of the present invention reduces the complexity in the design of the baseband processor by limiting it to provide only simple commands to the RF transceiver. The transceiver transmit core and receive core can include multiple sub-cores for converting signals to the proper communication standard. Therefore a single command from the base band processor for configuring the transceiver to operate with the desired communication standard can include the additional address information for accessing the memory subsystem. Furthermore, the size of the overall system is reduced by reducing the number of pins and conductive signal tracks throughout the PCB. The embodiments of the present invention are directed to digital control of peripheral components. The embodiments can be directed to analog control of specific peripheral components. For a given condition, a set of digital and analog patterns or settings can be stored in the memory and applied to a peripheral device.

INDUSTRIAL APPLICABILITY

The present invention can be applied in a wide range of communication systems. In particular, the invention is suitable in mobile telecommunication devices with limited size and processing capacities such as wireless phones, PDA's etc.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A communication system comprising:
   a signal processing device for transforming a data signal in multiple receive or transmit modes of operation;
   a memory subsystem for providing a previously stored bit pattern corresponding to one of the multiple receive or transmit modes of operation; and,
   a component module including at least two peripheral components in signal communication with the signal processing device, the component module receiving the previously stored bit pattern for selectively controlling one of the at least two peripheral components.

2. The communication system of claim 1, further including a baseband processor for providing a baseband command corresponding to one of the multiple receive or transmit modes of operation.

3. The communication system of claim 1, wherein the memory subsystem is integrated with the signal processing device.

4. The communication system of claim 1, wherein the baseband command includes a memory address corresponding to an address location of the previously stored bit pattern in the memory subsystem.

5. The communication system of claim 1, wherein the bit pattern includes a device address corresponding to the one of the at least two peripheral components, and operating information for controlling the one of the at least two peripheral components.

6. The communication system of claim 1, wherein the bit pattern is provided as a serial bitstream.

7. The communication system of claim 1, wherein the bit pattern includes an address portion for selecting the one of the at least two peripheral components, and a data portion for controlling states of the one of the at least two peripheral components.

8. The communication system of claim 6, wherein the memory subsystem includes a parallel to serial converter for providing the serial bitstream.

9. The communication system of claim 6, wherein the component module includes
   a serial to parallel converter converting the serial bitstream into parallel data,
   a command decoder for driving signals for controlling the one of the at least two peripheral components, and for providing selection signals in response to the parallel data, and
   an antenna switch for selectively coupling an antenna to the one of the at least two peripheral components in response to the selection signals.

10. The communication system of claim 1, wherein the memory subsystem provides the bit pattern as parallel signals.

11. The communication system of claim 10, wherein the component module includes a command decoder for driving signals for controlling the one of the at least two peripheral components, and for providing selection signals in response to the parallel signals, and an antenna switch for selectively coupling an antenna to the one of the at least two peripheral components in response to the selection signals.

12. The communication system of claim 10, wherein the component module includes an antenna switch for selectively coupling an antenna to the one of the at least two peripheral components in response to selection signals, the parallel signals including the selection signals and control signals connected to control inputs of the each of the at least two peripheral components.

13. The communication system of claim 1, wherein the signal processing device includes a radio frequency transceiver.

14. The communication system of claim 1, wherein each of the at least two peripheral components includes one of a power amplifier and a low noise amplifier.

15. A method for controlling peripheral components of a communication system, comprising:
   providing a bit pattern corresponding to a specific receive or transmit operating mode of the communication system to a component module including at least two peripheral components; and,
   controlling one of the at least two peripheral components in response to the bit pattern.

16. The method of claim 15, wherein the bit pattern is provided by a radio frequency (RF) transceiver of the communication system.

17. The method of claim 16, wherein a base band processor provides a baseband command for setting the specific receive or transmit operating mode of the transceiver.

18. The method of claim 17, wherein the RF transceiver includes a memory subsystem for storing the bit pattern and for providing the bit pattern in response to the baseband command.

19. The method of claim 18, wherein the baseband command includes a memory address corresponding to a memory location of the memory subsystem storing the bit pattern.

20. The method of claim 15, further including selectively connecting the one of the at least two peripheral components to an antenna in response to the bit pattern.

21. The method of claim 15, wherein controlling includes decoding the bit pattern for determining an address of the one of the at least two peripheral components and for driving signals for controlling the one of the at least two peripheral components.

22. The method of claim 21, wherein providing includes providing the bit pattern as a serial bitstream.

23. The method of claim 22, wherein decoding includes converting the serial bitstream into parallel signals corresponding to the bit pattern.

24. The method of claim 21, wherein providing includes providing the bit pattern as parallel signals.

25. A module for a wireless communication system having a signal processing device and an antenna, comprising:
   a bus interface for receiving a bit pattern from the signal processing device, the bus interface providing first control signals and second control signals in response to the bit pattern;
   at least two components in signal communication with the signal processing device, one of the at least two components being enabled in response to the first control signals; and,
   an antenna switch for selectively coupling the one of the at least two components to the antenna in response to the second control signals.

26. The module of claim 25, wherein the bit pattern is provided as a serial bitstream and the bus interface includes
   a serial to parallel converter for converting the serial bitstream into parallel signals, and
   a command decoder for driving signals for providing the first control signals and the second control signals in response to the parallel signals.

27. The module of claim 25, wherein the bit pattern is provided as parallel signals and the bus interface includes a command decoder for driving signals for providing the first control signals and the second control signals in response to the parallel signals.

\* \* \* \* \*